(12) United States Patent
Fujita et al.

(10) Patent No.: US 6,488,259 B1
(45) Date of Patent: Dec. 3, 2002

(54) VALVE DEVICE

(75) Inventors: Youichi Fujita, Tokyo (JP); Osamu Yatsuki, Tokyo (JP); Toshihiko Miyake, Tokyo (JP); Sotsuo Miyoshi, Tokyo (JP); Yuji Nakahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/629,920

(22) Filed: Jul. 31, 2000

(51) Int. Cl.⁷ .................. F16K 31/02; F16K 31/08
(52) U.S. Cl. ..................... 251/129.11; 251/65
(58) Field of Search ............... 251/129.11, 65

(56) References Cited

U.S. PATENT DOCUMENTS

| | | | |
|---|---|---|---|
| 4,414,942 A | * 11/1983 | Itoh et al. | 123/339.26 |
| 5,065,061 A | * 11/1991 | Satoh et al. | 310/104 |
| 5,496,102 A | * 3/1996 | Dimatteo et al. | 303/115.2 |
| 5,517,966 A | * 5/1996 | Kanazawa et al. | 123/396 |
| 5,677,581 A | * 10/1997 | Yoshida et al. | 310/156.08 |
| 5,785,296 A | * 7/1998 | Peube et al. | 251/129.11 |
| 5,923,111 A | * 7/1999 | Eno et al. | 310/153 |
| 6,129,061 A | * 10/2000 | Okuda et al. | 123/90.17 |
| 6,224,034 B1 | * 5/2001 | Kato et al. | 251/164 |

FOREIGN PATENT DOCUMENTS

| | | | |
|---|---|---|---|
| JP | 60-162463 | 6/1985 | |
| JP | 60-162462 | 8/1985 | |
| JP | 7-143715 | 6/1995 | |
| JP | 8-289520 | 11/1996 | H02K/23/52 |
| JP | 10-213016 | 8/1998 | |

* cited by examiner

*Primary Examiner*—Henry C. Yuen
*Assistant Examiner*—David A Bonderer
(74) *Attorney, Agent, or Firm*—Sughrue Mion, PLLC

(57) ABSTRACT

A valve device comprising a stator 22 having a predetermined number of coils arranged with substantially equal intervals in peripheral directions of a stator core, a rotor having a plurality of permanent magnet magnetic poles 29 at positions corresponding to the coils on an outer peripheral surface of the stator 22, a current carrying means 37 commutating a direct current supplied from a power source through the rotor 28 and applying the current to the coils of the stator 22, a shaft member located in a center of the rotor 28 and being movable in a direction of the shaft in response to rotation of the rotor 28, and a valve member 45 opening and closing by movement of the shaft member 30 for providing excellent responsiveness of valve opening and closing operations.

13 Claims, 3 Drawing Sheets

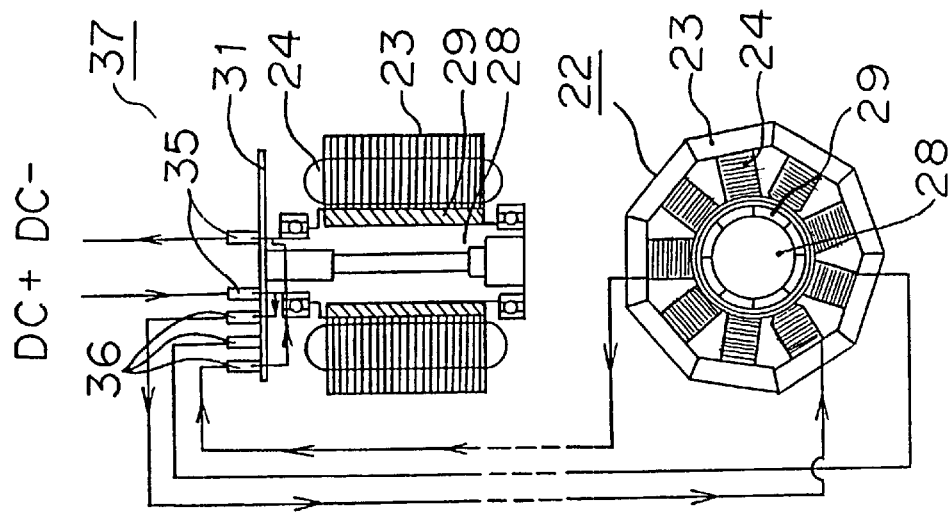
FIG. 2A
FIG. 2B
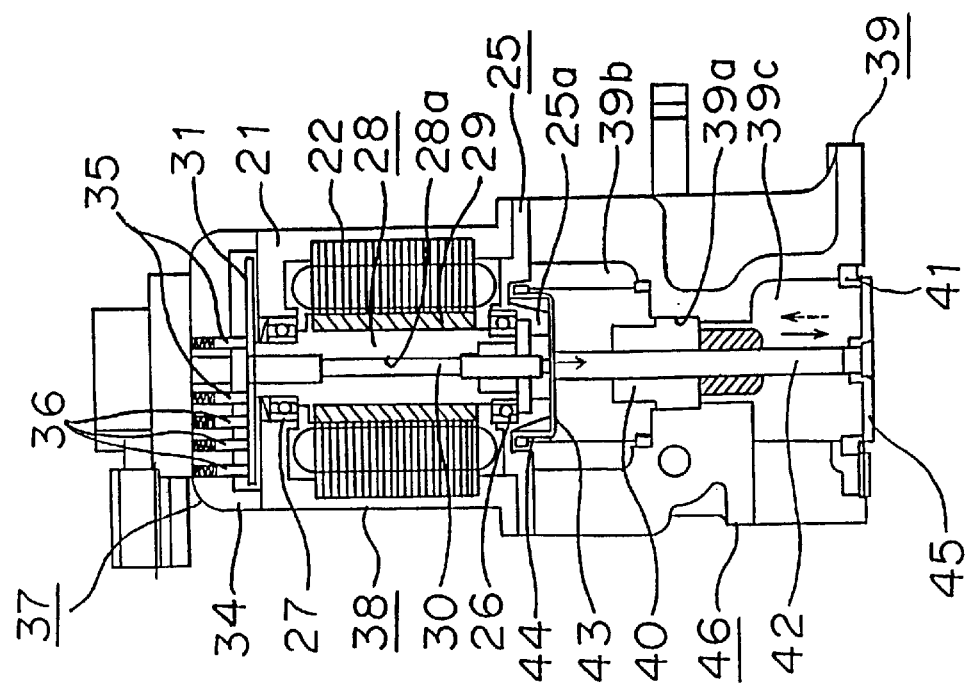
FIG. 1

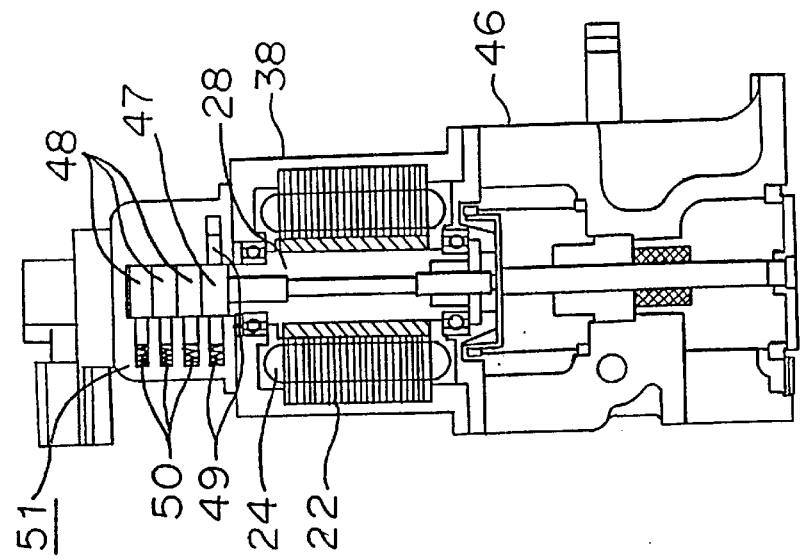
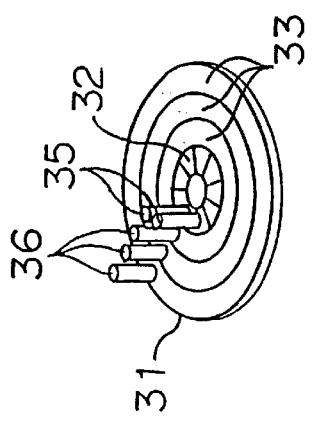
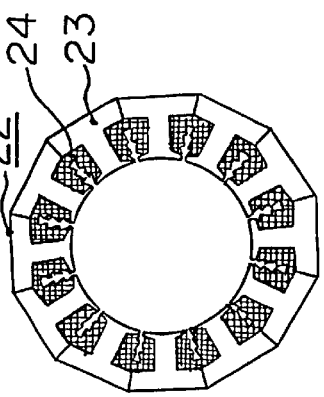
FIG. 5
FIG. 3
FIG. 4A
FIG. 4B

VALVE DEVICE

BACKGROUND OF THE INVENTION

1. Field of the Invention

The present invention relates to a valve device used in a control of circulation of an exhaust gas in exhaust gas recirculation (EGR) device, which recirculates a part of the exhaust gas from an engine of an automobile to an intake system to suppress generation of an inert gas for obtaining a good rate of fuel consumption, and so on, wherein the valve device is driven by a direct current brush motor.

2. Discussion of Background

FIG. 6 is a cross-sectional view illustrating a structure of such a valve device disclosed in, for example, Japanese Unexamined Patent Publication JP-A-10-21306.

In FIG. 6, numerical reference 1 designates a motor case; numerical reference 2 designates a rotor, accommodated in the motor case 1 and supported by a slide ball 3 at a top end thereof and by a ball bearing 4 at a bottom end thereof, and wound by a coil 5; and numerical reference 6 designates a stator located in an inner wall of the motor case 1 to surround the rotor 2 and having a permanent magnet magnetic pole 7 at a position corresponding to the coil 5 of the rotor 2.

Numerical reference 8 designates a commutator attached to an upper portion of the rotor 2; numerical reference 9 designates a brush, being in contact with the commutator 8 a pressure by the spring 10, for supplying a direct current supplied via a connector terminal 11 to the commutator 8; numerical reference 12 designates a valve case coaxially connected to the motor case 1; numerical reference 13 designates a motor shaft, screwed inside the rotor and being movable in an axial direction through a guide bush in response to a rotation of the motor; numerical reference 15 designates a valve driving shaft connected to a tip of the motor shaft and movable through the guide plate; numerical reference 17 designates a valve member, fixed to a tip of the valve driving shaft 15, for opening and closing a flow passage 19 by being in contact with a sealing member 18 located inside the valve case 12.

In thus constructed conventional valve device, when the direct current supplied through the connector terminal 11 is applied to the coil 5 of the rotor 2, a direct current motor is formed in corroboration with the permanent magnet magnetic pole 7 of the stator, whereby the rotor 2 is rotated. Along with the rotation, the motor shaft 13 screwed inside the rotor 2 is rotated, whereby the motor shaft 13 moves in response to an amount of the rotation, namely, it moves downward in FIG. 6. Therefore, the valve member 17 secured to a tip of the motor shaft 13 to be separated from the sealing member 18, whereby the flow passage 19 is released.

However, because thus constructed conventional valve device opens and closes the flow passage 19 by contacting and separating the valve member 17 and the sealing member 18 through the valve driving shaft 15 connected to the motor shaft, which is screwed inside the rotor 2 to be upward and downward moved by the rotation of the rotor 2, the motor shaft 13 should be inserted in and engaged with the rotor 2, and the coil 5 should be wound around an outer periphery of the rotor 2, whereby an outer diameter of the rotor 2 is increased. Therefore, there are problems that a moment of inertia is increased, and responsiveness of valve opening and closing operations is deteriorated.

SUMMARY OF THE INVENTION

It is an object of the present invention to solve the above-mentioned problems inherent in the conventional technique and to provide a valve device having excellent responsiveness of a valve opening and closing operation by reducing inertia of a rotor.

According to a first aspect of the present invention, there is provided a valve device comprising: a stator formed by arranging a predetermined number of coils in peripheral directions of a stator core with substantially equal intervals; a rotor formed by arranging a plurality of permanent magnet magnetic poles at positions respectively corresponding to the coils on an outer peripheral surface of the stator; a current carrying means commutating a direct current supplied from a power source through the rotor and applying this to each of the coils of the stator; a shaft member located in a center of the rotor and movable in a direction of the shaft in response to rotation of the rotor; and a valve member opened and closed by movement of the shaft member.

According to a second aspect of the present invention, there is provided a valve device according to the first aspect of the present invention, wherein the current carrying means includes: a commutator monolithically formed with the permanent magnet magnetic poles by a resin in the rotor and divided into many parts to commutate the direct current supplied from the power source through a first brush; and as much as n slip rings, electrically connected to corresponding divided parts of the commutator to apply a current commutated to n phases by the commutator through a second brush to corresponding coils of the stator.

According to a third aspect of the present invention, there is provided a valve device according to the second aspect of the present invention, wherein the commutator is formed by dividing a center or an outer peripheral annular portion of a disk into many parts in peripheral directions, and the slip ring is formed by dividing into n parts like concentric rings on an inner peripheral side or an outer peripheral side of the commutator.

According to a fourth aspect of the present invention, there is provided a valve device according to the first aspect or the second aspect of the present invention, wherein the current carrying means and the valve member are positioned different sides of the stator and the rotor in the direction of the shaft.

According to a fifth aspect of the present invention, there is provided a valve device according to the first aspect of the present invention, wherein the stator is formed by winding coils respectively around magnetic pole teeth of the stator core, formed by laminating a magnetic material and connecting a plurality of yokes like a belt, and bending the connecting portions to be in an annular shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein:

FIG. 1 is a cross-sectional view illustrating a structure of a valve device according to Embodiment 1 of the present invention;

FIG. 2A is a side view of the valve device in FIG. 1 illustrating a flow of a current through a motor of the valve device;

FIG. 2B is a plan view of the valve device in FIG. 1 illustrating the flow of the current through the motor;

FIG. 3 is a perspective view illustrating a structure of a current carrying means of the motor in FIG. 2;

FIG. 4A is a side view of a stator in the motor of the valve device in FIG. 1 illustrating a method of producing the stator;

FIG. 4B is a plan view of the stator in the motor of the valve device in FIG. 1 illustrating the method of producing the stator;

FIG. 5 is a cross-sectional view illustrating a structure different from the valve device illustrated in FIG. 1 according to Embodiment 1 of the present invention.

DETAILED DESCRIPTION OF THE PREFERRED EMBODIMENTS

Figure 6:
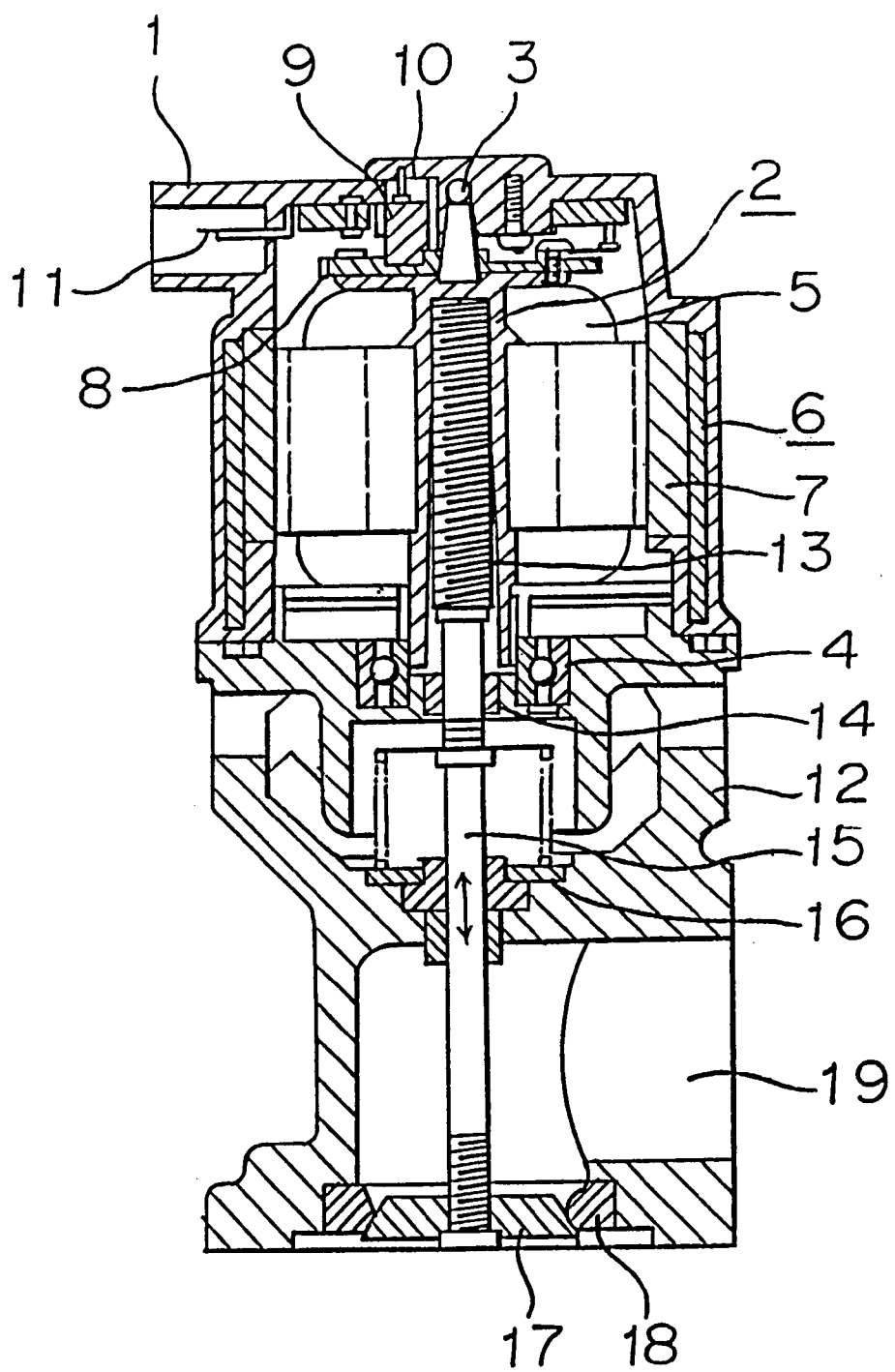
FIG. 6 is a cross-sectional view illustrating a structure of a conventional valve device.

A detailed explanation will be given of preferred Embodiments of the present invention in reference to FIGS. 1 through 5 as follows, wherein the same numerical references are used for the same or similar portions and description of these portions is omitted.

Embodiment 1

FIG. 1 is a cross-sectional view illustrating a structure of a valve device according to Embodiment 1 of the present invention. FIGS. 2A and 2B illustrate a current flow through a motor in the valve device illustrated in FIG. 1, wherein FIG. 2A is a cross-sectional view and FIG. 2B is a plan view. FIG. 3 is a perspective view illustrating a structure of a current carrying means of the motor illustrated in FIGS. 2A and 2B. FIG. 4 is a plan view illustrating a method of producing a stator of the motor in the valve device illustrated in FIG. 1. FIG. 5 is a cross-sectional view illustrating a structure of a valve device different from that in FIG. 1 according to Embodiment 1 of the present invention.

In these figures, numerical reference 21 designates a case of the motor, formed by a resin member; and numerical reference 22 designates a stator, monolithically molded with the case by molding a resin, wherein, as illustrated in FIG. 4A, magnetic materials formed by core pieces 23b, from which a magnetic pole tooth 23a is respectively protruded, connected through thin portions 23c as much as a predetermined number, are laminated to form a stator core 23. Then the coils 24 are wound around corresponding magnetic pole teeth 23a by a winding machine (not shown) just after laminating the magnetic materials to preferably wind the coils. Thereafter, as illustrated in FIG. 4B, the magnetic materials are formed to be in an annular shape by bending the thin portions 23c.

Numerical reference 25 designates a flange member located on one end of the motor case 21, wherein a boss 25a is formed to support a bearing 26 in a central portion of the flange member. Numerical reference 27 designates a bearing supported by the other end of the motor case 21 and concentrically arranged with the bearing 26. Numerical reference 28 designates a rotor supported by the bearings 26 and 27 on both ends thereof, having a plurality of permanent magnet magnetic poles 29 at positions corresponding to the coils 24 of the stator 22 in an outer periphery thereof, and having a screw hole 28a penetrating through a center thereof. Numerical reference 30 designates a shaft member screwed with the screw hole 28a of the rotor and being movable in a direction of a shaft in response to rotation of the rotor 28.

Numerical reference 31 designates a disk fixed to an end of the rotor 28 and rotating along with the rotor 28 as illustrated in FIG. 3. Numerical reference 32 designates a commutator formed by dividing a central annular portion of the disk 31 into many parts in peripheral directions. Numerical reference 33 designates slip rings formed by dividing into n parts on an outer peripheral side of the commutator 32 in concentrical annular shapes, in FIG. 3, three parts. Numerical reference 34 designates a bracket located on a side of the other end of the motor case 21. Numerical reference 35 designates a pair of first brushes supported by the bracket at one ends so as to be insulated and being slidably in contact with divided portions of the commutator 32 at the other ends with a predetermined pressure.

Numerical reference 36 designates as much as three second brushes supported by the bracket 34 at one ends and being slidably in contact with the slip rings 33 at the other ends with a predetermined pressure. A current carrying means 37 is formed by the disk 31, the commutator 32, the slip rings 33, the bracket 34, the pair of first brushes 35, and the second brushes 36. Further, a motor 38 is formed by the motor case 21, the stator 22, the stator core 23, the coil 24, the flange member 25, the bearings 26 and 27, the rotor 28, the permanent magnet magnetic poles 29, the shaft member 30, and the current carrying means 37.

Numerical reference 39 designates a valve case, formed by, for example, aluminum diecasting, and connected on the other side of the motor case 21 via the flange member 25. The valve case has a through hole 39a in a center thereof, and chambers 39b and 39c on both sides of the through hole 39a, wherein the chamber 39c is connected to an exhaust passage (not shown). Numerical reference 40 designates a guide bush arranged to clog the through hole 39a of the valve case 39. Numerical reference 41 designates a sealing member located in an opening of the chamber 39c. Numerical reference 42 designates a valve driving shaft hermetically assembled with and penetrating through the guide bush so as to be slidable. Numerical reference 43 designates a dish-like member secured on the end of the valve driving shaft 42 and located inside the chamber 39b. Numerical reference 44 designates a spring urging an outer edge of the dish-like member 43 on a side of the motor 38 with a predetermined force. Numerical reference 45 designates a valve member, attached on the other end side of the valve driving shaft 42 to open and close a gap between the chamber 39c, and connected to the exhaust passage (not shown) and an intake passage (not shown) by being in contact with and apart from the sealing member 41. A valve 46 is constructed by the valve case 39, the guide bush 40, the sealing member 41, the valve driving shaft 42, the dish-like member 43, the spring 44, and the valve member 45.

In the next, an operation of the valve device according to Embodiment 1 will be descried.

When a direct current flows from a power source (not shown) through one of the first brushes 35, the direct current is commutated by the commutator 32 as illustrated in FIGS. 2A through 3 and flows into the slip rings 33. The current is supplied on a side of the stator 22 through the second brushes 36. After flowing through the coil 24, the current flows again the second brushes 36, the slip rings 33, and the commutator 32, and returns on the side of power source through the other of the first brushes 35.

At this time, a rotational force is generated in the rotor 28 by an interaction between a magnetic flux generated by the coil 24, through which a current flows, and the permanent magnet magnetic pole 29 of the rotor 28. Because the disk 31 is rotated by the rotational force, positions where the first brushes 35 and the commutator 32 are in contact are switched over, and the coils 24, through which the current flows, are sequentially switched over, whereby the rotor 28 starts to continuously rotate. Along with the rotation of the rotor 28, the shaft member 30 screwed into the screw hole 28a of the rotor 28 moves on a side of the valve to push the dish-like member 43 by its tip end, and further moves by defeating an urging force by the spring 44. Accordingly the valve driving shaft 42, fixed to the dish-like member 43 at its end, moves in a direction of an arrow of a solid line by sliding inside the guide bush 40 to separate the valve member 45 attached on the other end side from the sealing member 41, whereby the gap between the chamber 39c and the intake passage (not shown) is released, and an exhaust gas is recirculated on a side of the intake passage (not shown).

On the other hand, the gap between the chamber 39c and the intake passage (not shown) is clogged, the rotor 28 is adversely rotated by making the direct current adversely flow on a side of the other first brush 35 to move the shaft member 30 in a direction of aparting from the valve 46. The dish-like member 43 moves along with the valve driving shaft 42 by the urging force by the spring 44 in a direction of an arrow of a broken line in FIG. 1, and stops at a position where the valve member 45 is in contact with the sealing member 41 as in a state illustrated in FIG. 1. The shaft member 30 further moves to be in a state of aparting from the dish-like member 43, wherein the valve member 45 maintains a preferable contact with the sealing member 41 by the urging force by the spring 44.

According to Embodiment 1, the coils 24 are located in the stator 22, the permanent magnet magnetic poles 29 are located in the rotor 28, the direct current from the power source is introduced in the commutator 32 through the first brushes 35 and commutated in the commutator 32, the commutated current is applied to the coils 24 through the slip rings 33 and the second brushes 36 to rotate the rotor 28, and the shaft member 30 is moved in the direction of the shaft by this movement, and the valve member 45 is opened or closed through the valve driving shaft 42, whereby a diameter of the rotor 28 can be reduced. Thus it becomes possible to obtain the valve device having excellent responsiveness of valve opening and closing operation by reducing an inertia of the rotor 28.

Further, since the current carrying means 37 and the valve member 45 are arranged on different sides with respect to the stator 22 and the rotor 28 in the shaft direction, it is possible to demonstrate an improvement of reliability by preventing an influence of heat generated by the current carrying means 37 from effecting on the valve 46. Further, since the stator 22 is formed to be like a ring by winding the coils 24 around the magnetic pole teeth 23a of the stator core 23, which is formed by connecting the plurality of core pieces through the thin portions 23c like a ring and by bending the thin portions 23c, winding becomes easy and workability in assembling the valve device is improved.

Further, since the commutator 32 is formed by dividing the central annular portion of the disk 31 into many parts in the peripheral directions, and the slip rings 33 are formed by dividing a portion of the disk 31 on the outer peripheral side of the commutator 32 to be in concentric annular shapes, the valve device can be miniaturized by drastically reducing a length of the valve device in the shaft direction in comparison with a structure having the current carrying means 51. For example, as illustrated in FIG. 5, it is possible to construct the value device by coaxially arranging the commutator 47 and the slip rings 48 with the rotor 28, and by commutating the direct current from the power source after introducing from the first brushes 49 to the commutator 47, and by applying the commutated current to the coils 24 of the stator 22 through the slip rings 48 and the second brushes 50, to miniaturize the value device.

The first advantage of the valve device according to the present invention is that the inertia of the rotor can be reduced, and the responsiveness of the valve opening and closing operation is excellent.

The second advantage of the valve device according to the present invention is that the valve device can be miniaturized.

The third advantage of the valve device according to the present invention is that the reliability of the valve device can be improved.

The fourth advantage of the valve device according to the present invention is that winding becomes easy, and workability of assembling the valve device can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A valve device comprising:
   a stator having a predetermined number of coils arranged in peripheral directions of a stator core;
   a rotor having a plurality of permanent magnet magnetic poles arranged at positions respectively corresponding to the coils of the stator;
   a current carrying means commutating a direct current supplied from a power source through the rotor and applying the commutated current to the coils of the stator;
   a shaft member located in a center of the rotor and being movable in a direction of the shaft member in response to rotation of the rotor; and
   a valve member opened and closed by movement of the shaft member.

2. The valve device according to claim 1,
   wherein the current carrying means includes:
   a commutator monolithically formed with the permanent magnet magnetic poles by a resin in the rotor and divided into parts to commutate the direct current supplied from the power source through a first brush; and
   a predetermined number of slip rings electrically connected to corresponding divided parts of the commutator to apply a current commutated to a predetermined number of phases by the commutator through a second brush to corresponding coils of the stator, wherein the predetermined number of slip rings is equal to the predetermined number of phases.

3. The valve device according to claim 2,
   wherein the commutator has one of a center and an outer peripheral annular portion of a disk divided into parts in peripheral directions, and
   one of an inner peripheral side and an outer peripheral side of the commutator is divided into the predetermined number of slip rings.

4. The valve device according to claim 1, wherein the current carrying means and the valve member are positioned on different sides of the stator and the rotor in the direction of the shaft member.

5. The valve device according to claim 2, wherein the current carrying means and the valve member are positioned on different sides of the stator and the rotor in the direction of the shaft member.

6. The valve device according to claim 1, wherein the coils are respectively wound around magnetic pole teeth of the stator core, and the magnetic pole teeth extend from yokes that are connected together via connecting portions.

7. A valve device comprising:
- a stator having a predetermined number of coils arranged in peripheral directions of a stator core;
- a rotor having a plurality of permanent magnet magnetic poles arranged at positions respectively corresponding to the coils of the stator;
- a current carrying means commutating a direct current supplied from a power source through the rotor and applying the commutated current to the coils of the stator;
- a shaft member located in a center of the rotor and being movable in a direction of the shaft member in response to rotation of the rotor; and
- a valve member opened and closed by movement of the shaft member,
- wherein the current carrying means includes
  i. a commutator monolithically formed with the permanent magnet magnetic poles by a resin in the rotor and divided into parts to commutate the direct current supplied from the power source through a first brush; and
  ii. a predetermined number of slip rings electrically connected to corresponding divided parts of the commutator to apply a current commutated to a predetermined number of phases by the commutator through a second brush to corresponding coils of the stator, wherein the predetermined number of slip rings is equal to the predetermined number of phases.

8. The valve device according to claim 7,
- wherein the commutator has one of a center and an outer peripheral annular portion of a disk divided into parts in peripheral directions, and
- one of an inner peripheral side and an outer peripheral side of the commutator is divided into the predetermined number of slip rings.

9. The valve device according to claim 7, wherein the current carrying means and the valve member are positioned on different sides of the stator and the rotor in the direction of the shaft member.

10. A valve device comprising:
- a stator having a stator core on which a predetermined number of coils are arranged;
- a rotor provided in the stator, and having a plurality of permanent magnet magnetic poles arranged at positions respectively corresponding to the coils of the stator;
- a commutator operative to commutate a direct current through the rotor and to the coils of the stator;
- a shaft member located in a center of the rotor and being movable in a longitudinal direction of the shaft member in response to rotation of the rotor; and
- a valve member opened and closed by movement of the shaft member.

11. A valve device comprising:
- a stator having a stator core on which a predetermined number of coils are arranged;
- a rotor provided in the stator, and having a plurality of permanent magnet magnetic poles arranged at positions respectively corresponding to the coils of the stator;
- a commutator operative to commutate a direct current through the rotor and to the coils of the stator;
- a shaft member located in a center of the rotor and being movable in a longitudinal direction of the shaft member in response to rotation of the rotor; and
- a valve member opened and closed by movement of the shaft member,
- wherein the commutator is divided into parts to commutate the direct current supplied from the power source through a first brush, and
- wherein the device further includes a predetermined number of slip rings are electrically connected to corresponding divided parts of the commutator to apply a current commutated to a predetermined number of phases by the commutator through a second brush to corresponding coils of the stator, and the predetermined number of slip rings is equal to the predetermined number of phases.

12. The valve device according to claim 11,
- wherein the commutator has one of a center and an outer peripheral annular portion of a disk divided into parts in peripheral directions, and
- one of an inner peripheral side and an outer peripheral side of the commutator is divided into the predetermined number of slip rings.

13. The valve device according to claim 11, wherein the commutator and the valve member are positioned on different sides of the stator and the rotor in the direction of the shaft member.

* * * * *